July 18, 1961  R. L. MATHIAS, SR  2,992,515
APPARATUS FOR FORMING PERFORATED GLASS BODIES
Filed Sept. 9, 1957  2 Sheets-Sheet 1

INVENTOR.
R. L. MATHIAS, SR.
BY E. J. HOLLER &
W. A. SCHAICH
ATTORNEYS

July 18, 1961   R. L. MATHIAS, SR   2,992,515
APPARATUS FOR FORMING PERFORATED GLASS BODIES
Filed Sept. 9, 1957   2 Sheets-Sheet 2
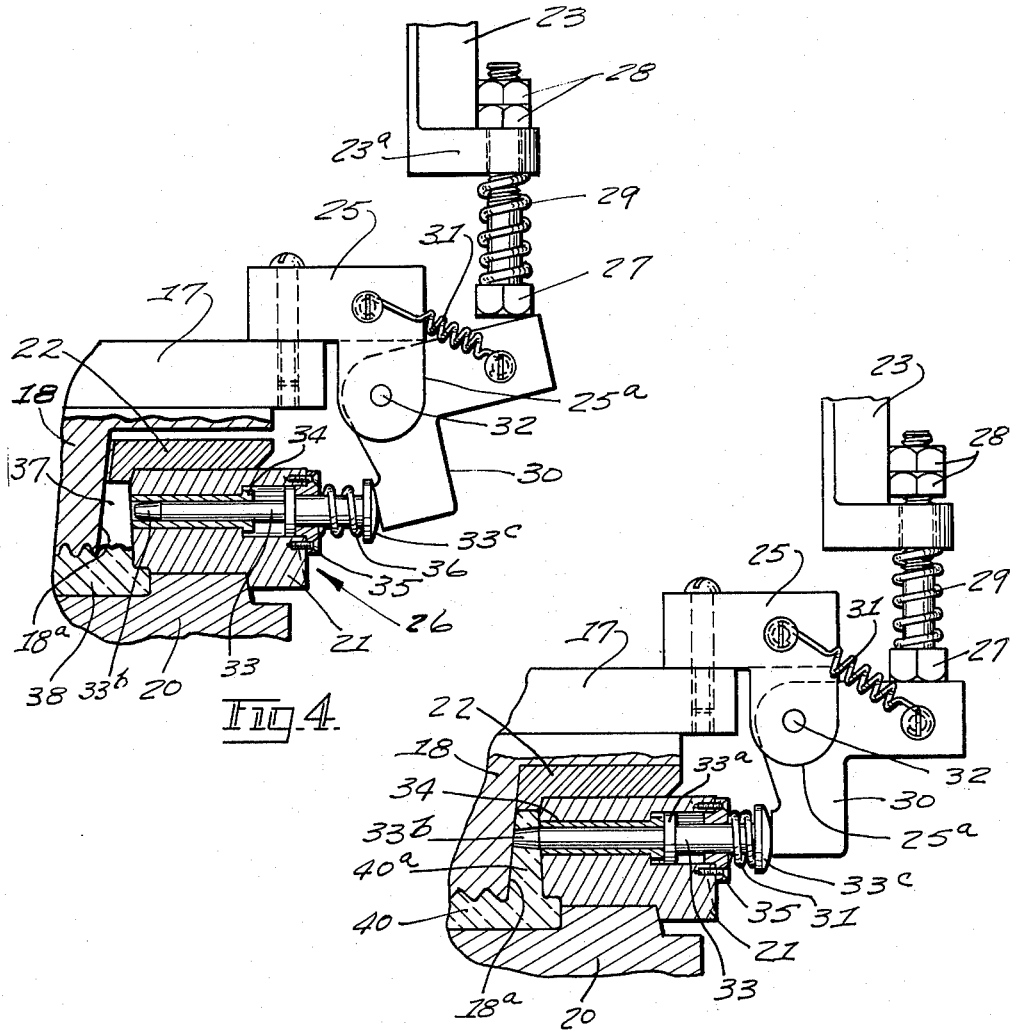
INVENTOR.
R. L. MATHIAS, SR.
BY E. J. HOLLER &
W. A. SCHAICH
ATTORNEYS

United States Patent Office 2,992,515
Patented July 18, 1961

2,992,515
APPARATUS FOR FORMING PERFORATED GLASS BODIES
Russell L. Mathias, Sr., Maumee, Ohio, assignor to Kimble Glass Company, a corporation of Ohio
Filed Sept. 9, 1957, Ser. No. 682,800
9 Claims. (Cl. 49—72)

The present invention relates to glass working and more particularly to apparatus for press forming glass bodies having at least one perforation therein.

According to my invention, glass bodies such as halves of glass blocks for example, are formed by pressing a molten gob of glass in plastic condition in a hollow mold with a perforating tool extending through the thickness of the glass body during its formation. However, the invention is not limited to the production of such items as glass block component parts, but is equally applicable to a wide variety of bowl-shaped articles having one or more openings therein.

Prior methods of perforating, in so far as known to applicant, involve perforation by the use of abrasives or alternatively, the application of heat in conjunction with various forms of glass working tools. This invention is concerned with improvements involving the formation of a perforation in an article during its initial formation. Heretofore, it has been ordinary practice in the use of heat in perforating glass articles to direct a highly concentrated, needle-like flame at the surface to be perforated to soften the same, and then force a prod or rod into the softened glass to draw out or form a so-called stocking or horn. The glass surrounding this stocking or horn is distorted to some extent by the drawing action and there are other inherent deficiencies in forming sidewall perforations or openings by this method. A perforation formed in a completed article by this method is frequently marked by thin jagged edge surfaces which are often full of surface checks. Furthermore, attaining a uniform or tapered perforation at a given area of partially finished article is considerably more costly when done in a subsequent operation.

In the manufacture of glass block halves for example, each half has been press formed in a hollow mold to provide a conventionally square, flanged article having a planar annular sealing surface. In recent years there has been a continuing trend toward light-weight completed glass block units. Heretofore, the block halves which are sealed together at the termination of their flanges have been of considerable thickness. In order to manufacture glass block units having thinner cross-sectional dimensions and yet utilize direct glass-to-glass fusion-type sealing at their flanges, it has been required to vent the interior of the block halves on sealing to prevent thermal distortion and/or deformation of inner surfaces of the block units. This is particularly true where the inner surfaces are comprised of prismatic surfaces or coated with light diffusing materials for controlling and directing light transmitted through the finished block units.

Accordingly, it is an object of the present invention to provide glass working apparatus capable of forming a finished glass article having at least one perforation therein which perforation may be precisely formed in a wall area of the article during its fabrication without deformation thereof or without subsequent reheating or reworking of the article.

Another object of the present invention is to provide a pressing apparatus for forming perforated hollow glass articles in such a manner that the surfaces contiguous with the perforation are not damaged or their contours altered as the glass is pressed therearound.

Another object of this invention is to provide improved molding apparatus for fabricating component parts for hollow glass units having an opening extending through a flange portion thereof, which parts may be rapidly and economically formed by the subject apparatus in a unitary operation.

The specific nature of this invention, as well as other objects and advantages thereof, will become apparent to those skilled in the art from the following detailed description, taken in conjunction with the annexed sheets of drawings on which, by way of preferred example only, are illustrated the preferred embodiments of this invention.

On the accompanying drawings:

FIG. 4 is a fragmentary view partially in vertical sectional taken along the line 4—4 of FIG. 2.

FIG. 5 is a view similar to FIG. 4 showing the lowermost position of the press assembly.

FIG. 6 is a fragmentary perspective view of a perforated glass article formed in accordance with the present invention.

Figure 1:
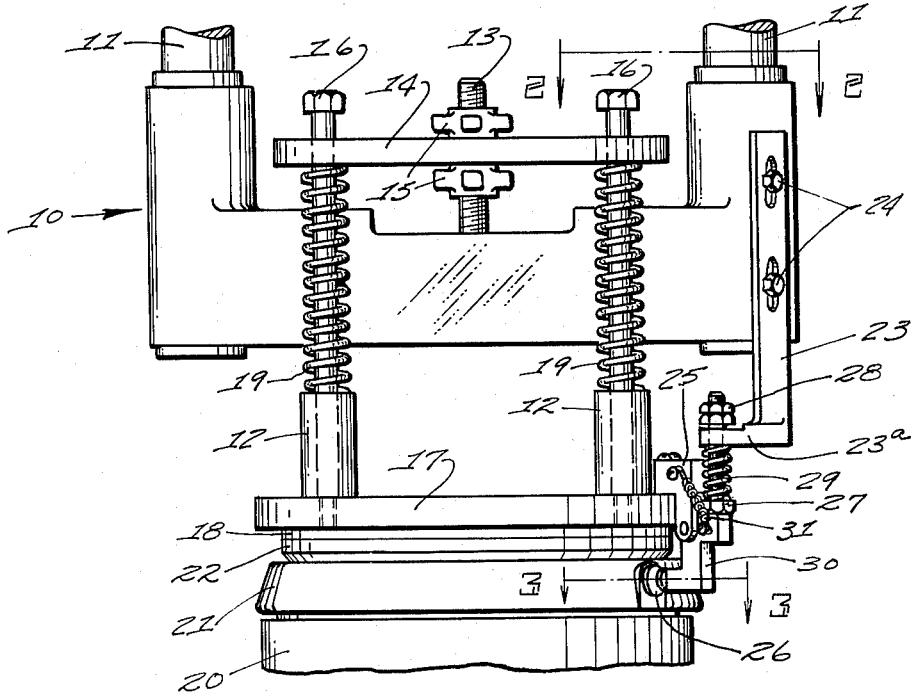
FIG. 1 is an elevational view of a glass working press assembly embodying principles of the present invention.

Referring particularly to FIG. 1, the invention as shown is applied to and forms a part of a press molding machine which, except as to the particular mechanism for forming the perforation in molded articles, is in the main of conventional construction.

The machine essentially comprises a plunger cross head 10 which is reciprocably operable upon stationary vertical columns 11. Cross head 10 is lifted and lowered by a piston motor which reciprocates within a cylinder mounted on a machine frame (not shown).

The plunger support mechanism is attached centrally to the lower portion of press cross head 10 by means of a threaded vertical support stud 13 which extends upwardly from a center portion of cross head 10. Stud 13 serves to firmly retain upper spring plate 14 within the press head 10 centrally between the plurality of vertical columns 11. Stud 13 passes through a central opening in upper spring plate 14. Upper spring plate 14 is held in a horizontal plane by adjustable height regulating knobs 15 which are threaded on support stud 13 above and below spring plate 14.

Connecting rods 16 pass through openings in bushings 12 and connect to plunger support plate 17. Rods 16 serve to guide and limit the vertical loading applied in the molding operation by the plunger 18. Each of the connecting rods 16 is surrounded by a compression spring 19 which extend between the upper surface of bushings 12 and the lower surface of upper spring plate 14. Thus, support plate 14 is normally carried in a fixed position by plunger head 10 with its upper surface in contact with the head portions of connecting rods 16 which are retained in their lowermost position by distended springs 19. The relative vertical position of upper spring plate 14 may be adjusted by threaded knobs 15 to constitute a rigidly carried back-up plate for the yieldable plunger mechanism. On FIG. 1 the plunger cross head 10 is illustrated in its extreme lowermost position with springs 19 compressed as maximum loading is applied to plunger 18 in the molding operation.

Press plunger 18 is attached to plunger support plate 17 arranged in vertical alignment with mold base plate 20. Base plate 20 has an upper surface adaptable to forming the central lower surface of the molded article. Mold base plate 20 is surrounded by a ring shell 21 which has an upwardly projecting inner wall capable of forming the exterior surface of the flange portion of a hollow molded article. The vertical axis of plunger 18 is arranged coincidental with the central axes of mold base plate 20 and its surrounding ring shell 21. On the upper surface of ring shell 21 is disposed an annular finish ring 22. The mold unit thus comprises a body mold 20, a ring shell 21 and a finish ring 22 which together form a mold cavity 37. The mold sections shape the exterior surfaces of the pressed article and the plunger the interior.

A bracket or contact arm 23 is rigidly attached to cross head 10 extending in a vertical direction projecting downwardly with its lower end adjacent to plunger support plate 17. Contact arm 23 may be affixed to an outer region of cross head 10 by two or more machine bolts 24, as shown on FIG. 1, or may be tack welded thereto. Arm 23 has a horizontally extending portion 23a which extends into near relationship and slightly above mold ring shell 21.

Horizontal portion 23a of contact arm 23 has a machine bolt 27 freely disposed in an opening therein with its head facing downwardly. The threaded upper portion of bolt 27 is restrained by several locking nuts 28 and the main body portion of bolt 27 is surrounded by a compression spring 29 disposed below arm portion 23a. Thus, rod or bolt 27 is adapted to yieldable movement upwardly.

A support block 25 is mounted on the upper surface at a peripheral area of plunger support plate 17 having an exteriorly and downwardly extending yoke portion 25a within which is pivotally mounted an L-shaped member 30. Member 30 is mounted on pin 32 for angular rotation within yoke portion 25a. Support block 25 and L-shaped member 30 are both arranged in vertical alignment with bolt 27 on the extremity of horizontal portion 23a of contact arm 23, as shown on FIGS. 2, 4 and 5.

L-shaped member 30 which is mounted at its corner on horizontal pin 32 is capable of angular movement in a vertical plane through an acute angle. An extension spring 31 is attached to the upper portions of support block 25 and L-shaped member 30 to retain the same in its raised position with its uppermost portion immediately below the extremity of contact arm 23 and its yieldable rod or bolt 27. Rod or bolt 27 is vertically aligned to contact the upper surface of pivotally mounted L-shaped member 30 during lowering of cross head 10.

Figures 2, 3:
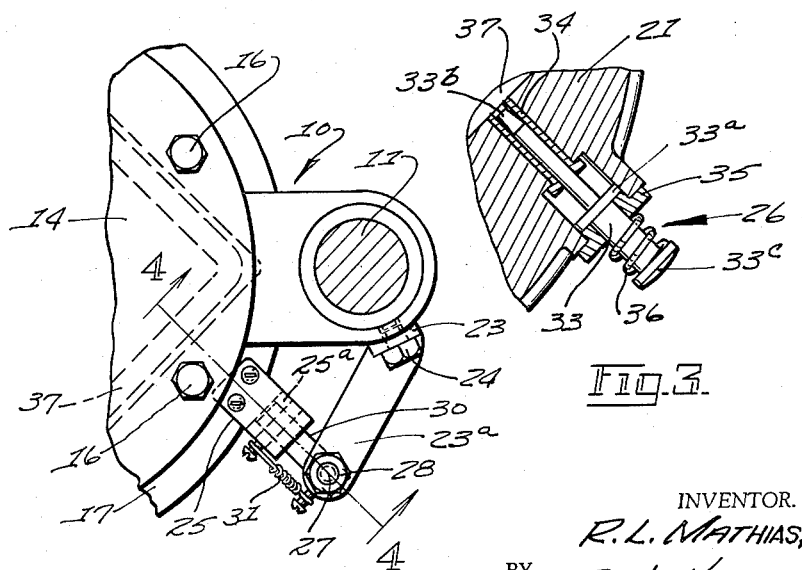
FIG. 2 is a fragmentary plan view taken along the line 2—2 of FIG. 1.
FIG. 3 is a fragmentary horizontal sectional view taken along the line 3—3 of FIG. 1.

As shown on FIGS. 1 and 2, the horizontal portion 23a of contact arm 23 extends to the desired area of the mold and plunger wherein a perforation is desired to be formed in the molded article.

A probe pusher mechanism 26 is mounted within and comprises an integral part of ring shell 21. As shown on FIG. 3, mechanism 26 is comprised of a rigid pin 33 essentially circular in shape having a flange portion 33a in its central region which limits its sliding horizontal movement into and out of the mold cavity 37. Pin 33 comprises the primary operable member of the probe pusher mechanism 26 and extends through several bushings 34 and 35 disposed in horizontal openings in the ring shell side wall. The inner and outer ends of pin 33 operate through bushings 34 and 35 disposed internally and externally of ring shell 21 respectively.

The inner end 33b of pin 33 is tapered over a portion of its length equidistant to the limit of its horizontal travel into the mold cavity 37. The outer portion of pin 33 comprises an enlarged head 33c. A short compression spring 36 is employed around the outer region of pin 33 between head 33c and bushing 35 to maintain the pin in its outermost position with tapered end 33b retracted within ring shell 21. The outer portion of pin 33 may be of slightly greater cross-sectional area where it extends through bushing 35. Bushing 35 is affixed to an exterior portion of ring shell 21 in axial alignment with inner bushing 34. The probe or pin 33 is thus readily adaptable to free slidable movement in a horizontal plane with its flange 33a between the opposing inner surfaces of bushings 34 and 35.

As illustrated on FIGS. 1, 4 and 5, operation of the apparatus is as follows:

When plunger cross head 10 is lowered, contact arm 23 is moved downwardly lowering the attached pusher rod or bolt 27. Bolt 27 is held in its extreme lowermost position in a yieldable manner by spring 29. Its operable position is regulated by a pair of locking stop nuts 28 and the lower extremity or head of inverted bolt 27 is arranged to physically contact L-shaped member 30 during final stages of lowering the plunger head.

As the plunger 18 is carried downwardly into its projected position by cross head 10 after a gob or charge of molten glass 38 is dropped into the mold cavity 37, the thermoplastic material is pressed outwardly into the vacancies of the mold cavity 37 and initially fills the central panel portion of the molded article. In the early stages of pressing the molten glass as shown on FIG. 4, plunger 18 arrives at near its lower position with the glass 38 primarily filling only the center portion of the mold cavity 37. At this time pusher probe mechanism 26 is in its retracted position with its tapered end 33b entirely housed within ring shell 21. This is the normal position of the probe at all times other than during the extreme lowermost movement of press plunger 18.

As the plunger 18 carried by cross head 10 continues its downward movement beyond that indicated on FIG. 4, the molten glass 38 is pressed further outwardly into the lower regions of the flange area of the mold cavity 37 so that the same is not entirely filled. During this time plunger cross head 10 continues to move downwardly carrying contact arm 23 and its contact pusher rod 27. During this final stage of downward movement of plunger 18, pusher rod 27 comes in direct physical contact with the upper surface of L-shaped member 30 moving it downwardly and angularly so that its inner vertical surface contacts pin head 33c driving it from its retracted position within ring shell 21 into its projected position within mold cavity 37. On completion of its horizontal movement, the extremity of pin end 33b contacts plunger sidewall 18a prior to the arrival of the glass 38 at the pin level in the ring shell sidewall. With resilient loading provided by the yieldable nature of pusher arm 27 and its encompassing spring 29, the pusher probe mechanism 26 terminates its downward and inward movement on contact with plunger sidewall 18a. The amount of loading thereagainst is governed by the amount of compression introduced into springs 29 and 36 and tension introduced into spring 31, the latter being of lesser strength. The molten glass 38 is then pressed further by increased loading on plunger 18 to entirely fill the flange area of mold cavity 37 around pin end 33b.

The compressive loading applied by plunger 18 on forming the thermoplastic material is controlled by the amount of compressive loading imparted into springs 19 against upper spring plate 14. When the compression on the pressed glass plunger reaches a certain level, the downward travel of plunger 18 is stopped and it is ready to be returned to its elevated position with the article fully pressed. In the normal downward movement of plunger 18, support block 25 mounted on plunger support plate 17 is slowed down and stopped prior to completion of angular movement of L-shaped member 30 and projection of pin 33.

Reviewing the relative positions of the probe pusher mechanism 26 during various stages of pressing the thermoplastic gob into a partially completed article as shown on FIGS. 4 and 5, pusher pin 33 is initially in its retracted position entirely within and exteriorly of ring shell 21. At this time the molten gob of glass 38 is only partially pressed between plunger and mold surfaces.

As shown on FIG. 5, when plunger 18 continues downward through latter stages of its pressing movement, the molten glass is moved upwardly into the annular flange portion of the article around the tapered portion 33b of projected pin 33. Prior to this time contact arm 23 has lowered still further and its pusher rod 27 in operative connection rotates L-shaped member 30 angularly in a clockwise direction in a vertical plane to drive pusher pin 33 into contact with the sidewall of plunger forming surface 18a. At this time, spring 31 which retains the L-shaped member 30 in its raised position is distended and spring 36 on the outer portion of pin 33 is compressed while the pin is moved inwardly with its center flange portion 33a near or in contact with the outer surface of inner bushing 34. The glass then moves upwardly to surround the pin tapered portion 33b and to form the flange portion 40a of the molded article 40. The pin mechanism is preferably arranged so that the glass surrounds the pin rather than having the pin penetrate the glass.

The tapered pin end 33b facilitates molding glass therearound without the formation of laps or checks. A cylindrical shaped pin is not as desirable since it is more conducive to introducing the stated defects into a pressed glass article. Actually, it may be theorized that the glass tends to initially surround the smaller cross-sectional end of the pin tapered portion 33b first and proceeds toward the larger cross-sectional area thereof. The final article exhibits only minimum amount of objectionable lapping of the glass and no checks are observable at its perforated area.

Following pressing of finished article 40, plunger 18 is moved upwardly by the reciprocable cross head 10 and L-shaped member 30 is turned upwardly by spring 31 following upward movement of contact arm 23. Probe pin 33 then moves outwardly with its tapered end 33b drawn within ring shell 21. Upon complete removal of plunger 18 from the vicinity of the mold bottom plate 20, shell and finish rings 21, 22 are elevated from molding relationship with the bottom plate 20 and the completed article 40 is removed from the mold.

As shown on FIG. 6, the molded glass article 40 comprises a completed half of a glass block unit with a tapered opening 40b formed in its annular flange portion 40a. The perforation or opening 40b has smooth surfaces without deleterious checks or cracks which would tend to weaken this particular area of flange 40a. The single half of a glass block unit is shown with a light-directing inner prismatic surface 40c on its inner face and a plane outer surface 40d. This is merely one type of product which may be fabricated by the present invention.

Pusher pin mechanism 26 may be located in any convenient peripheral location on ring shell 21 where it is desired to locate in the hollow article an inwardly tapered horizontal perforation 40b or one having a slightly different configuration. As practiced in the present invention, the completed article has at least one perforation extending completely through the thickness of the upright annular glass sidewall of the article. However, the article may be formed with two or more similarly formed openings or perforations therein.

Since the perforation or opening 40b is formed integrally with the fabrication of the article while the glass is in a heat-softened condition, the tapered opening 40b does not possess rough or thin jagged edges. The opening 40b lends itself to venting the block when two similar halves, only one of which need have such an opening therein, are sealed together by direct fusion of the glass. The opening or perforation 40b may be conveniently sealed subsequent to joining the halves of the completed block unit by using a small glass bead or length of rod sealed therein by one or more suitable synthetic resins.

A very important feature of forming glass block halves with an opening therein is that they provide venting of the interior of a thin block unit during its sealing to protect precisely contoured surfaces such as prismatic surfaces 40c or surfaces which are coated with light diffusing materials. Also thinner glass block units may be manufactured than previously available by utilizing the present invention for press forming the hollow parts. Block units each having an opening therein may be readily passed through a stress-relieving lehr without creating unbalanced atmospheric loading on the hollow articles. The openings may be utilized to introduce an unreactive gas, dehydrated air or coloring materials into the block or other hollow articles.

It will, of course, be understood that various details of construction or procedure may be modified through a wide range without departing from the principles of this invention, and it is, therefore, not the purpose to limit the patent granted hereon otherwise than necessitated by the scope of the appended claims.

I claim:

1. In an apparatus for press forming hollow glass articles having at least one aperture extending through a sidewall portion thereof, the combination of a hollow mold having upwardly extending inner wall surfaces providing a mold cavity open at its upper end, a press plunger adapted to cooperate with said hollow mold, means for reciprocating said press plunger into and out of press forming relation with said mold, a movable pin mounted within a sidewall portion of said mold, resilient means for retaining said movable pin in retracted relation with its inner aperture forming end disposed within said mold sidewall, pin advancing means mounted on said plunger for advancing the pin from retracted to projected position within said mold cavity, and means on said plunger reciprocating means adapted to actuate the said pin advancing means.

2. The combination in accordance with claim 1 in which the pin advancing means comprises a support block and a pivotable member mounted therein.

3. The combination in accordance with claim 1 in which the pin has an aperture-forming tapered inner end and is mounted in a substantially horizontal position.

4. In an apparatus for press forming hollow flanged articles from molten glass having at least one aperture formed in a flange portion thereof, the combination of a hollow mold open at its upper end and having upright inner wall surfaces adapted to form the outer surfaces of the article flange portion, a vertically reciprocable press plunger disposed in aligned relation with said hollow mold and adapted to cooperate therewith, means for reciprocating said press plunger into and out of press forming relation with said mold, a reciprocable pin having an aperture-forming inner end portion disposed in an upper flange forming region of said mold, resilient means for retaining the inner end portion of said pin normally retracted within said mold sidewall, means secured to said plunger for advancing the pin from retracted to projected position internally of the said mold cavity, and means on said plunger reciprocating means adapted to actuate the said pin advancing means.

5. The combination in accordance with claim 4, wherein said resilient means adapted to retain said pin in retracted position comprises a compression spring.

6. The combination in accordance with claim 4, wherein said means for advancing the said pin comprises an L-shaped member mounted in pivoted relation adapted to arcuate movement in essentially a vertical plane.

7. The combination in accordance with claim 4, wherein said means on said plunger reciprocating means for actuating said pin advancing means comprises a downwardly projecting yieldable member.

8. In an apparatus for press molding a hollow glass article having an annular flange with at least one aperture extending therethrough, the combination of a mold comprised of a body member and an annular ring member providing upright interior wall surfaces, a press plunger, the side surfaces of said plunger in projected position being spaced from the upright wall surfaces of said mold to provide a mold cavity within which the annular flange of said article is molded, an aperture-forming reciprocable pin mounted in the ring member of said mold and movable transversely from a retracted position beyond said mold cavity to a projected position within said cavity resilient means for retaining said pin normally in retracted position with its aperture-forming inner end disposed within said ring member, means adapted to reciprocate said plunger from retracted to projected positions to mold thereby a charge of molten glass within said mold cavity, pin advancing means secured to said plunger for moving said pin internally into said mold cavity, and a yieldable arm member carried by said plunger reciprocating means for actuating said pin advancing means during the interval of maximum projection of said plunger.

9. The combination in accordance with claim 8, wherein said pin advancing means comprises an L-shaped member mounted on said plunger in pivotal relation for movement in a vertical plane, said L-shaped member being adapted to effect horizontal movement of said pin from vertical movement of said plunger into projected relation.

References Cited in the file of this patent

UNITED STATES PATENTS

| | | |
|---|---|---|
| 178,504 | Beck | June 13, 1876 |
| 673,847 | Ruckl | May 7, 1901 |
| 2,762,079 | Morse | Sept. 11, 1956 |
| 2,853,835 | Talbent | Sept. 30, 1958 |

FOREIGN PATENTS

| | | |
|---|---|---|
| 569,118 | Germany | Jan. 28, 1933 |